April 2, 1929.  I. SMITH  1,707,819
LAWN TRIMMER
Filed Jan. 17, 1927

Inventor:
Ira Smith

Patented Apr. 2, 1929.

1,707,819

UNITED STATES PATENT OFFICE.

IRA SMITH, OF GRAYSLAKE, ILLINOIS.

LAWN TRIMMER.

Application filed January 17, 1927. Serial No. 161,498.

The lawn trimmer of this invention is intended for use along walls, fences or other obstructed areas where lack of space prevents the approach of an ordinary lawn mower sufficiently close to trim the relatively narrow strip of grass growing in such restricted spaces.

The regulation lawn mower is provided with a ground wheel at each end of the rotary cutter, and the presence of the ground wheel on the side adjacent to the wall, fence or other obstruction prevents the rotary cutter from operating along the wall or fence. The present invention is intended to overcome this difficulty by providing a cutter which is driven by one ground wheel only, which cutter extends on the opposite side substantially to the extreme end of the implement, so that it will cover and operate over restricted areas incapable of being cut by an ordinary lawn mower.

The trimmer is also usable for cutting of grass borders around flower beds or the like, which are ordinarily incapable of being cut by an ordinary lawn mower on account of the narrow width of the border, and by reason of the fact that an ordinary lawn mower must straddle such a border, which is frequently out of the question by reason of the elevation of the border with respect to the ground level on each side, so that in straddling the border the ground wheels will not hold the cutter at a proper elevation to permit a narrow strip of grass comprising the border to be cut. The present trimmer being driven from one side only holds the cutter in overhanging relation to the border and may be used in many cases under conditions which would preclude the use of a lawn mower of standard type.

Further details will appear from a description of the invention in conjunction with the accompanying drawings wherein—

Figure 1:
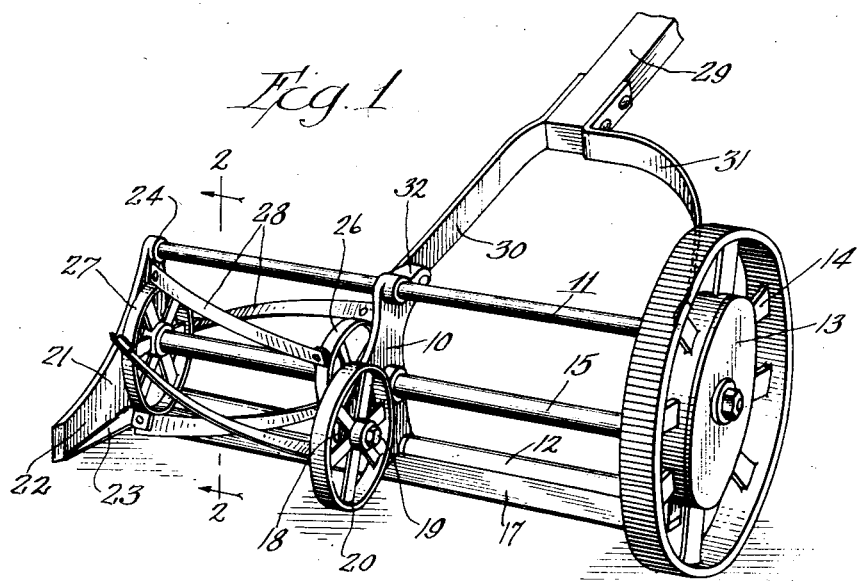
Figure 1 is a perspective view of the trimmer of the present invention.
Figure 2:
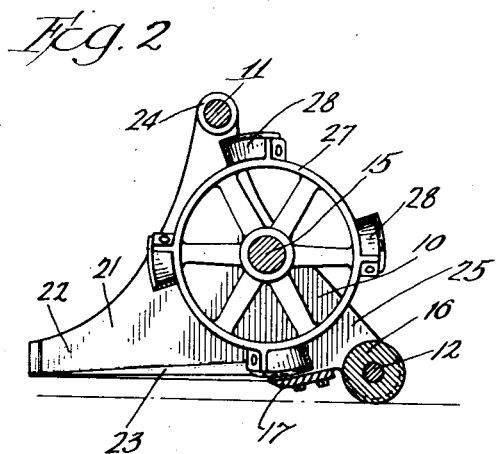
Fig. 2 is a cross sectional elevation taken on line 2—2 of Fig. 1.
Figure 3:
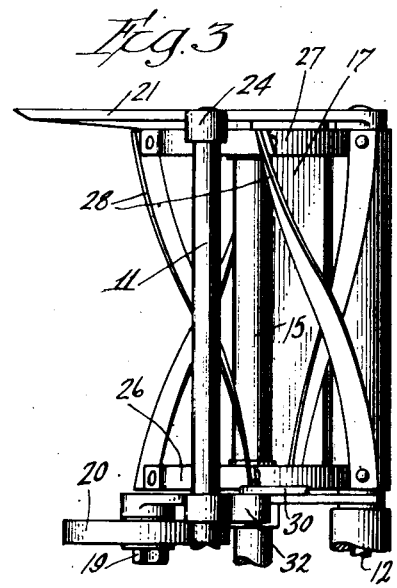
Fig. 3 is an enlarged plan view of the cutting end of the trimmer.

The trimmer as a whole is mounted upon a frame comprising a medial carriage plate 10 through which extend an upper bar 11 and a lower bar 12 which, at the driving end, are rigidly secured to a gear housing 13 which provides a journal mounting for a drive wheel 14 which through suitable gearing, not shown, serves to drive a cutter shaft 15. The arrangement of the ground wheel gear drive and housing is in all respects the same as that customarily found in lawn mowers of standard construction, so that it is not deemed necessary to provide a more detailed description of these features.

The lower cross bar 12 provides a journal mounting for the customary rear ground roller 16 in front of which is mounted a beveled adjustable cutter bar 17 which co-operates with the rotary cutter in a manner common to lawn mowers of standard construction. The cutter bar 17 is suitably secured by bolts to the base of the medial carriage plate 10 and also to the gear housing 13, and occupies the customary position immediately in front of the ground roller as is usual in lawn mower construction.

The features now to be described are special to the present invention and will be described in more complete detail. The medial carriage plate 10 is configured to provide a forwardly extending projection 18 which carries a laterally extending pin 19 which serves as a journal mounting for a front center wheel 20, which, in conjunction with the ground wheel, affords a rolling support for the trimmer as a whole.

On the cutting side of the medial carriage plate, the upper bar 11, the roller bar 12 and the driving cutter shaft 15 are extended to the degree required to provide for the cutting of a strip of the desired width, as, for instance, ten inches. The end of the bars and the shaft are carried by a triangular end shield 21 which constitutes a guard plate for the rotary cutter, and also serves as a deflector for flexing the grass outwardly from the wall or other obstruction into the path of the cutter. The forward end or toe 22 of the shield is beveled at its tip end to assist in the deflecting function, and the lower edge of the shield is provided with an inwardly extending flange 23 which tapers from the front to the rear, as indicated in Fig. 1.

The bar 11 is rigidly secured to the apex 24 of the shield, and the end of the roller bar 12 is rigidly secured to the rear or heel end 25 of the shield, while the end of the cutter shaft 15 is journaled within the shield at a point midway between the frame bars 11 and 12.

The shaft 15 carries a rotary cutter comprising inner and outer wheels 26 and 27, respectively, the periphery of which wheels afford mountings for a plurality of spirally extending cutter blades 28, which constitute the cutting elements of the trimmer and act in conjunction with the cutter bar 17 in severing the grass in a manner well understood in the art of lawn mower construction. In fact, the rotary cutter as a whole is identical, except in proportionate dimensions, with the cutters commonly employed in lawn mowers.

The cutter wheel 27 occupies a position in closely adjacent relation to the shield 21, and the cutter wheel 26 lies in closely adjacent relation to the medial carriage plate 10, so that the cutter in rotating will span the entire space between the shield and carriage plate, and in view of the fact that the shield is thin and serves to deflect the grass toward the cutter, it is obvious that the trimmer may be propelled along the strip of ground immediately adjacent to a fence or other obstruction to cut the strip of grass lying immediately adjacent thereto, and that the preponderance of weight on the driving side of the trimmer will serve to hold the cutting end in properly elevated relation with respect to the ground to secure uniformity in the cutting action.

The trimmer is propelled by means of a handle 29 secured at its inner end to a bail comprising a straight inner connecting bar 30 and an outwardly bowed or curved bar 31 which are pivoted respectively to a lug 32 on the medial plate 10 and to the inner upper portion of the gear housing, the arrangement being such as to leave the cutting end of the trimmer unobstructed above the top cross bar 11 which may facilitate the propelling of the trimmer beneath overhanging or other obstructions which might otherwise interfere with the operation.

By making the trimmer of an overall width substantially equal to that of a standard lawn mower, and by driving the trimmer from one end only, and confining the cutting section to the opposite half of the frame, the point of driving ground contact is removed from the center of the machine sufficiently to insure an easy and uniform advance of the machine and the cutter bar and rotary cutter will be held in right angular relation to the line of travel of the machine without any undue tendency for the machine to swerve, or turn in toward the cutting side. In short, the machine will be adequately balanced despite the fact that the cutter is driven from one end only. In like manner, by locating the ground wheel, gearing and gear housing at the point indicated, the weight of the machine will be adequately balanced to insure adequate driving contact with the ground and prevent the tilting down of the cutting end of the machine due to a lack of ground support at the cutting end.

The cutter as a whole possesses all of the distinctive advantages in its cutting action of a standard lawn mower with the special advantages due to the arrangement of the cutter. At the same time, by driving from one end only, under the conditions and uses encountered, the machine will not be subject to disturbances and irregularities in the ground surface, which are frequently encountered in close proximity to fences or other obstructions, and, at the same time, the arrangement is one which permits the cutting of grass borders under conditions which would preclude the use of lawn mowers which require ground support at each end of the machine. The arrangement of the handle and the means for pivoting the bail, allow the handle, if desired, to be thrown over to the front of the trimmer, which permits the trimmer to be drawn forward instead of being pushed, if a pulling rather than a pushing action is found more convenient under certain conditions of use.

I claim:

1. In a lawn trimmer, the combination of a frame, a cutter bar secured to the lower portion of the frame, a single driving ground wheel of relatively large diameter and massive proportions located at the outer end of the frame, a medial supporting wheel located near the middle of the frame and in advance of the cutter bar and of relatively small diameter as compared with the diameter of the ground wheel, a cutter shaft extending lengthwise of the frame behind the medial supporting wheel and above the cutter bar, said shaft being in train with the ground wheel, and cutter blades carried by the cutter shaft at the end thereof beyond the medial supporting wheel, the weight of the ground wheel being sufficient to balance the machine without wheel support at the cutting end of the machine.

2. In a lawn trimmer, the combination of a frame, a cutter bar secured to the lower portion of the frame, a single driving ground wheel of relatively large diameter and massive proportions located at the outer end of the frame, a medial supporting wheel located near the middle of the frame and in advance of the cutter bar and of relatively small diameter as compared with the diameter of the ground wheel, a cutter shaft extending lengthwise of the frame behind the medial supporting wheel and above the cutter bar, said shaft being in train with the ground wheel, cutter blades carried by the cutter shaft at the end thereof beyond the medial supporting wheel, the weight of the ground wheel being sufficient to balance the machine without wheel support at the cutting end of the machine, a deflector shield secured to the frame at the end thereof opposite to the ground wheel, and a handle secured to the frame at points adjacent to the ground wheel and the medial supporting wheel respectively, and unsecured to the frame on the cutting side of the trimmer.

IRA SMITH.